US012059062B2

(12) United States Patent
Huang

(10) Patent No.: US 12,059,062 B2
(45) Date of Patent: Aug. 13, 2024

(54) MULTIFUNCTIONAL FINGER RING

(71) Applicant: DONGGUAN KANGXIANG HARDWARE PRODUCTS CO., LTD., Guangdong (CN)

(72) Inventor: Xia Cong Huang, Guangdong (CN)

( * ) Notice: Subject to any disclaimer, the term of this patent is extended or adjusted under 35 U.S.C. 154(b) by 101 days.

(21) Appl. No.: 17/777,060

(22) PCT Filed: Nov. 17, 2020

(86) PCT No.: PCT/CN2020/129351
§ 371 (c)(1),
(2) Date: May 16, 2022

(87) PCT Pub. No.: WO2022/000941
PCT Pub. Date: Jan. 6, 2022

(65) Prior Publication Data
US 2022/0400820 A1    Dec. 22, 2022

(30) Foreign Application Priority Data
Jun. 28, 2020 (CN) ........................ 202010597565.8

(51) Int. Cl.
*A44C 9/00* (2006.01)
*B26B 1/02* (2006.01)
(Continued)

(52) U.S. Cl.
CPC .............. *A44C 9/0053* (2013.01); *B26B 1/02* (2013.01); *B26B 27/007* (2013.01)

(58) Field of Classification Search
CPC ....... A44C 9/0053; A44C 9/00; A44C 9/0084; B26B 1/02; B26B 27/007; B26B 1/04; B26B 1/048
(Continued)

(56) References Cited

U.S. PATENT DOCUMENTS 128,316 A * 6/1872 Laffray ................. B26B 27/007 30/298
309,426 A * 12/1884 Wickersham ....... B27B 17/0016 63/15
(Continued)

FOREIGN PATENT DOCUMENTS

CN 203814758 U * 9/2014
CN 207428590 U * 6/2018

*Primary Examiner* — Jack W Lavinder

(57) ABSTRACT

A multifunctional finger ring, comprising a finger ring body (10) and a blade (30) movably provided on the finger ring body (10); the finger ring body (10) comprises an inner ring (11), a first outer half ring (20) and a second outer half ring (26); the first outer half ring (20) and the second outer half ring (26) are oppositely sleeved on the upper and lower sides of the inner ring (11), and the first outer half ring (20) can be assembled on the inner ring (11); the blade (30) is hidden between the first outer half ring (20) and the inner ring (11) when closed, the second outer half ring (26) is integrally connected to the inner ring (11); positioning grooves (261) are provided at the connections between the upper ends of two sides of the second outer half ring (26) and the inner ring (11), and positioning blocks (21) corresponding to the positioning grooves (261) are provided at the lower ends of two sides of the first outer half ring (20), and during assembly, the positioning blocks (21) are embedded into the positioning grooves (261); and limiting protruding blocks (15) are provided on outer surfaces of the left and right sides of the inner ring (11), and limiting grooves (22) corresponding to the limiting protruding blocks (15) are provided on inner surfaces of the left and right sides of the first outer half ring (20), and during assembly, the limiting protruding blocks (15) are embedded into the limiting grooves (12). The finger ring is convenient to assemble, increasing the assembly efficiency and reducing the production cost, can protect the blade, and is convenient to carry.

6 Claims, 4 Drawing Sheets

(51) Int. Cl.
*B26B 1/04* (2006.01)
*B26B 27/00* (2006.01)

(58) Field of Classification Search
USPC ............................................ 63/1.12, 15, 15.7
See application file for complete search history.

(56) References Cited

U.S. PATENT DOCUMENTS

| | | | | | |
|---|---|---|---|---|---|
| 456,812 | A | * | 7/1891 | Gibson | B26B 1/02 30/298 |
| 579,655 | A | * | 3/1897 | Saladee | B26B 1/02 30/298 |
| 1,842,427 | A | * | 1/1932 | Sammartino | A44C 17/02 63/15 |
| 4,118,948 | A | * | 10/1978 | Gralnik | A44C 9/00 63/15 |

* cited by examiner

MULTIFUNCTIONAL FINGER RING

BACKGROUND OF THE INVENTION

The present invention relates to the technical field of rings, in particular, relates to a multifunctional ring.

Rings are common hand ornaments in daily life, mainly used to ornament hands. In daily life, cutting tools are needed to open parcels, cut paper and ropes. Therefore, a ring knife that can cut or trim articles appears on the market and mainly comprises a ring body, a blade and a switch; its blade is hidden in the ring body when it is not used and is opened when being used. However, any of the existing ring knives is characterized by inconvenient assembly, low assembly efficiency and high production cost.

BRIEF SUMMARY OF THE INVENTION

Aiming at the defects of the prior art, the present invention provides a multifunctional ring, which can make the assembly of the ring more convenient, improve the assembly efficiency, lower the production cost, easy to use and high practicability.

In order to achieve the above purpose, the technical solution of the present invention is that:

A multifunctional ring comprises a ring body and a blade movably arranged on the ring body; the ring body comprises an inner ring, a first outer half ring and a second outer half ring; the first outer half ring and the second outer half ring sleeve the outer sides of the inner ring; the first outer half ring can be assembled onto the inner ring; when the blade is closed, it is hidden between the first outer half ring and the inner ring.

As a preferred embodiment, the second outer half ring is integrally connected with the inner ring.

As a preferred embodiment, the first outer half ring and the second outer half ring relatively sleeve the upper and lower sides of the inner ring.

As a preferred embodiment, at the joint between the upper ends on the left and right sides of the second outer half ring and the inner ring is designed with positioning grooves and the lower ends on the left and right sides of the first outer half ring are designed with positioning blocks corresponding to the positioning grooves, and at the time of assembly, the positioning blocks are embedded into the positioning grooves.

As a preferred embodiment, on the outer surfaces on the left and right sides of the inner ring are designed with limit protruding blocks, and on the inner surfaces on the left and right sides of the first outer half ring are designed with limit grooves corresponding to the limit protruding blocks, and at the time of assembly, the limit protruding blocks are embedded into the limit grooves.

As a preferred embodiment, the upper end of the inner ring is designed with a mounting part for installing the blade, and the blade is rotatably installed onto the mounting part through the rotating shaft, and the inner surface of the first outer half ring is designed with a holding groove corresponding to the mounting part.

As a preferred embodiment, the first outer half ring is designed with a holding cavity corresponding to the blade, the holding cavity is connected with the holding groove, on the mounting part is designed with a torsional spring that makes the blade always rotate out, and at the upper end of the holding cavity is designed with an opening aperture for the blade to rotate out.

As a preferred embodiment, the multifunctional ring also comprises a switch used for controlling the movement of the blade, the inner ring is designed with a holding groove used for installing the switch and the switch is movably arranged in the holding groove.

As a preferred embodiment, the surface of the side of the switch facing the holding groove is designed with a groove; inside the groove is designed with a reset spring which makes the switch always move in the direction of the blade; inside the holding groove is designed with an outward stop block; at the time of assembly, one end of the stop block enters the groove and both ends of the reset spring are in pressure contact with the side wall surface of the stop block and the inner wall surface of the groove respectively.

As a preferred embodiment, at the left end of the mounting part is designed with a through groove for inserting the switch, the upper end of the switch is inserted into the mounting groove via the through groove and is in pressure contact with the blade, the lower side of the left end of the blade is designed with a pressure contact surface, at the joint between the through groove and the mounting groove is designed with a pressure part corresponding to the pressure contact surface, and the pressure part is located below the blade; when the blade is closed, the pressure contact surface is in contact with the upper end of the switch; when the blade is opened, the pressure contact surface is in pressure contact with the pressure part.

Compared with the prior art, the present invention has obvious advantages and beneficial effects. Specifically, by designing a ring body comprised of an inner ring, a first outer half ring and a second outer half ring, the first outer half ring and the second outer half ring sleeve the outside of the inner ring, and the first outer half ring can be assembled onto the inner ring. At the time of assembly, it is necessary to first install the blade and the switch onto the inner ring, and then cover the first outer half ring onto the outside of the blade and the switch so as to make the assembly of the ring more convenient, improve the assembly efficiency and lower the production cost; by designing the pressure contact surface and the pressure part, when the blade is opened, the pressure contact surface is in contact with the pressure part to limit the continuous rotation of the blade, prevent the upper surface of the blade from colliding with the upper opening aperture of the holding cavity and thus prevent the damaged upper surface of the blade from affecting the appearance of the product; the product is easy to carry and it can be used to conveniently open parcels and cut paper in daily life; and in outdoor fishing or mountaineering activities, it is convenient to cut fishing lines, ropes and other items. In short, it has high practicability and is suitable for popularizing its use.

In order to more clearly elaborate its structural features, technical means, specific purposes and functions, the present invention is further described in detail below in combination with the accompanying drawings and specific embodiments:

Mark numbers in the accompanying drawings:

10—ring body;
11—inner ring;
12—mounting part;
121—mounting groove;
122—mounting orifice;
123—through groove;
124—pressure part;
13—holding groove;
14—stop block;
15—limit protruding block;
20—first outer half ring;
21—positioning block;
22—limit groove;
23—holding groove;
24—holding cavity;
241—opening aperture;
242—interstice;
25—notch;
26—second outer half ring;
261—positioning groove;
30—blade;
301—pressure contact surface;
302—pressure groove;
31—rotating shaft;
32—torsional spring;
33—switch;
331—groove;
332—pressure protruding block;
34—toggle block;
35—reset spring.

DETAILED DESCRIPTION OF THE INVENTION

In the description of the present invention, it should be noted that the orientational or positional relationships indicated by the terms “center”, “upper”, “lower”, “left”, “right”, “vertical”, “horizontal”, “inside” and “outside” refer to the orientational or positional relationships shown in the accompanying drawings, only used for the convenience of describing the present invention and simplifying the description, not used for indicating or implying that the devices or elements concerned must have specific orientations, or constructed or operated in specific orientations; therefore, such words cannot be understood as limitations on the present invention.

In the description of the present invention, it should be noted that unless otherwise clearly specified and limited, the terms “installation” and “connection” should be understood in a broad sense. For example, it can be fixed connection, removable connection or integrated connection; it can be mechanical connection or electrical connection; it can be direct connection or indirect connection through an intermediate medium, and it can be the connection between two elements. For those skilled in the art, the specific meanings of the above terms in the present invention can depend on specific circumstances.

Figure 1:
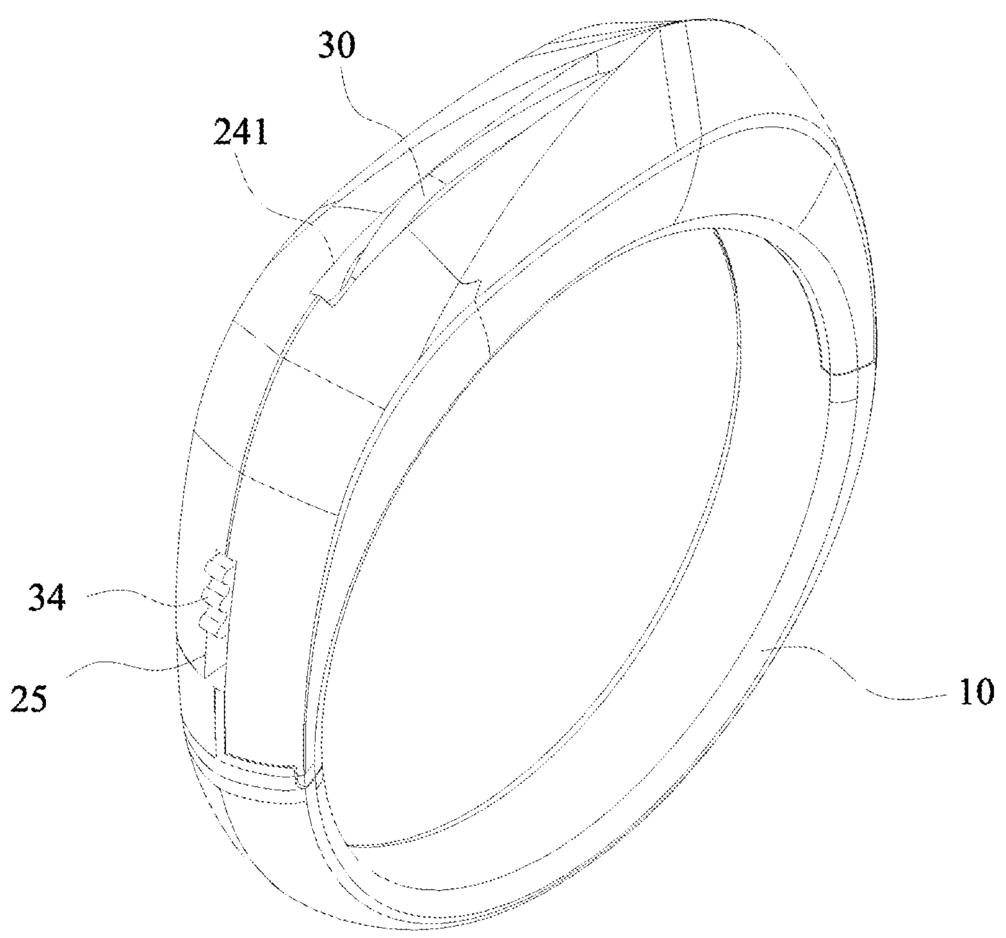
FIG. 1 is a schematic diagram of an assembly structure of an embodiment of the present invention.
Figure 2:
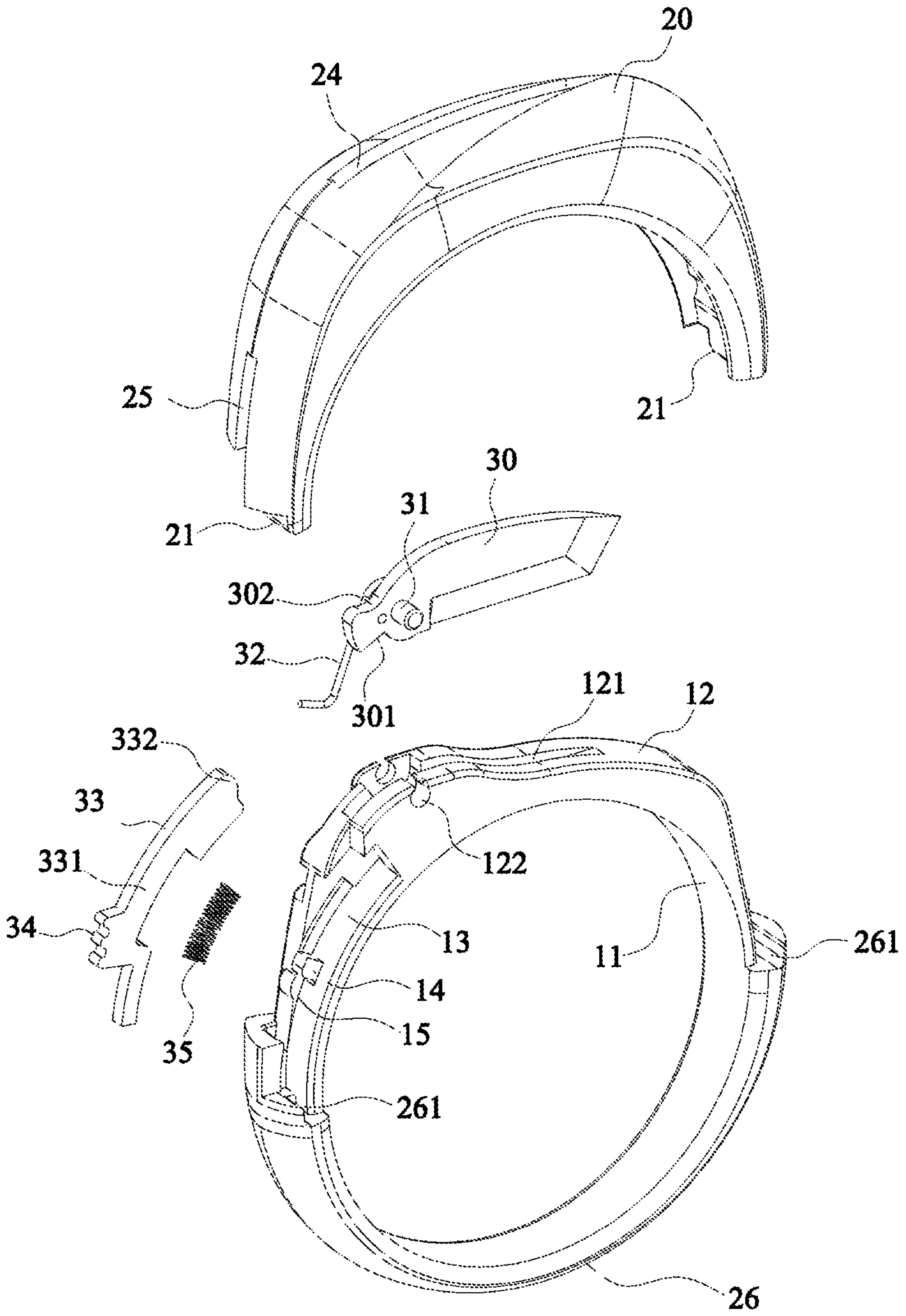
FIG. 2 is an exploded schematic diagram of an embodiment of the present invention.
Figure 3:
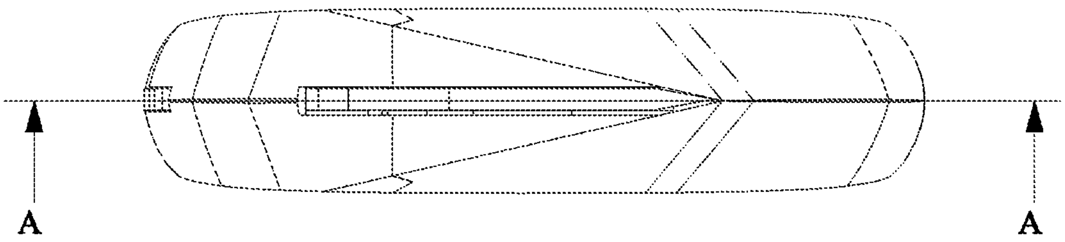
FIG. 3 is a top view of an embodiment of the present invention.
Figure 4:
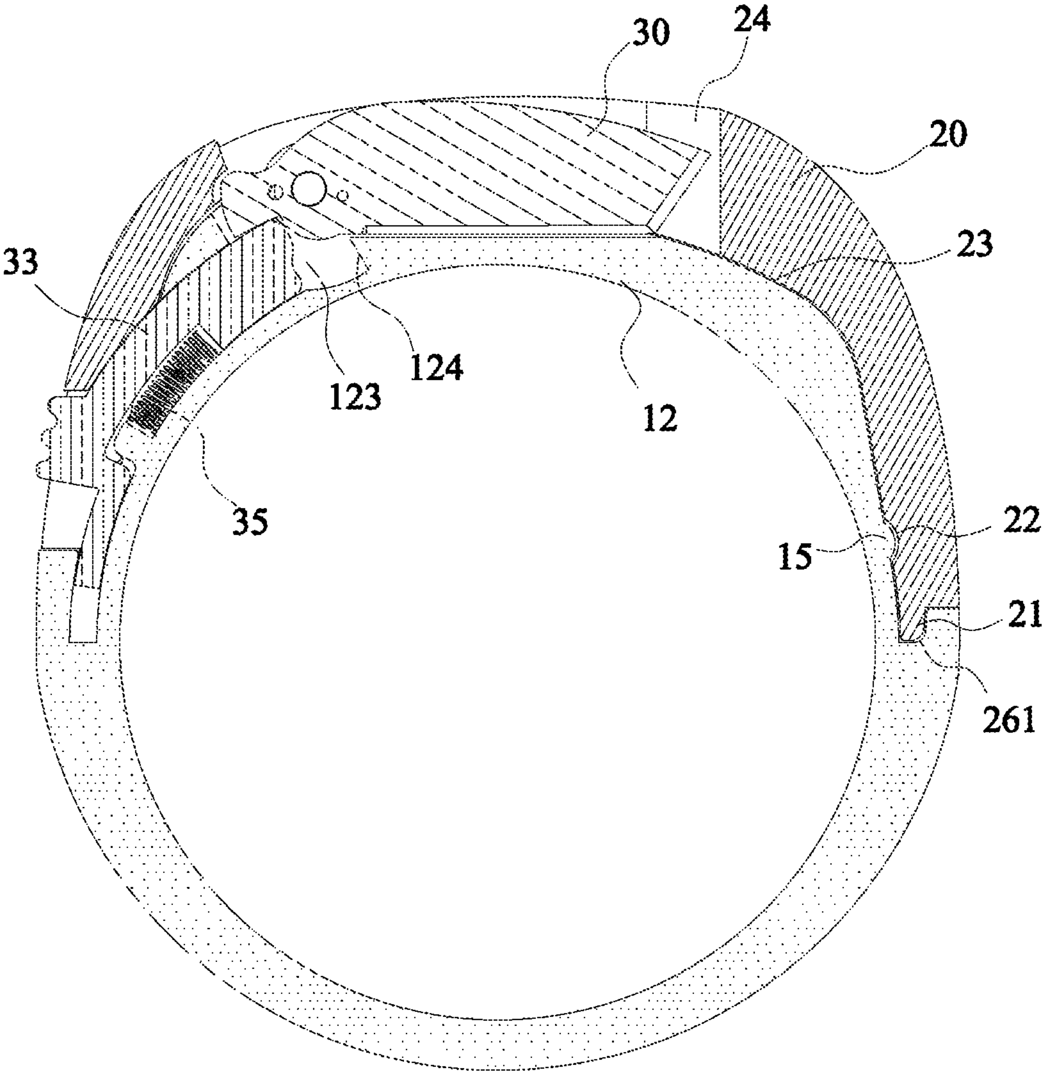
FIG. 4 is a schematic cross-sectional view at A-A in FIG. 3.
Figure 5:
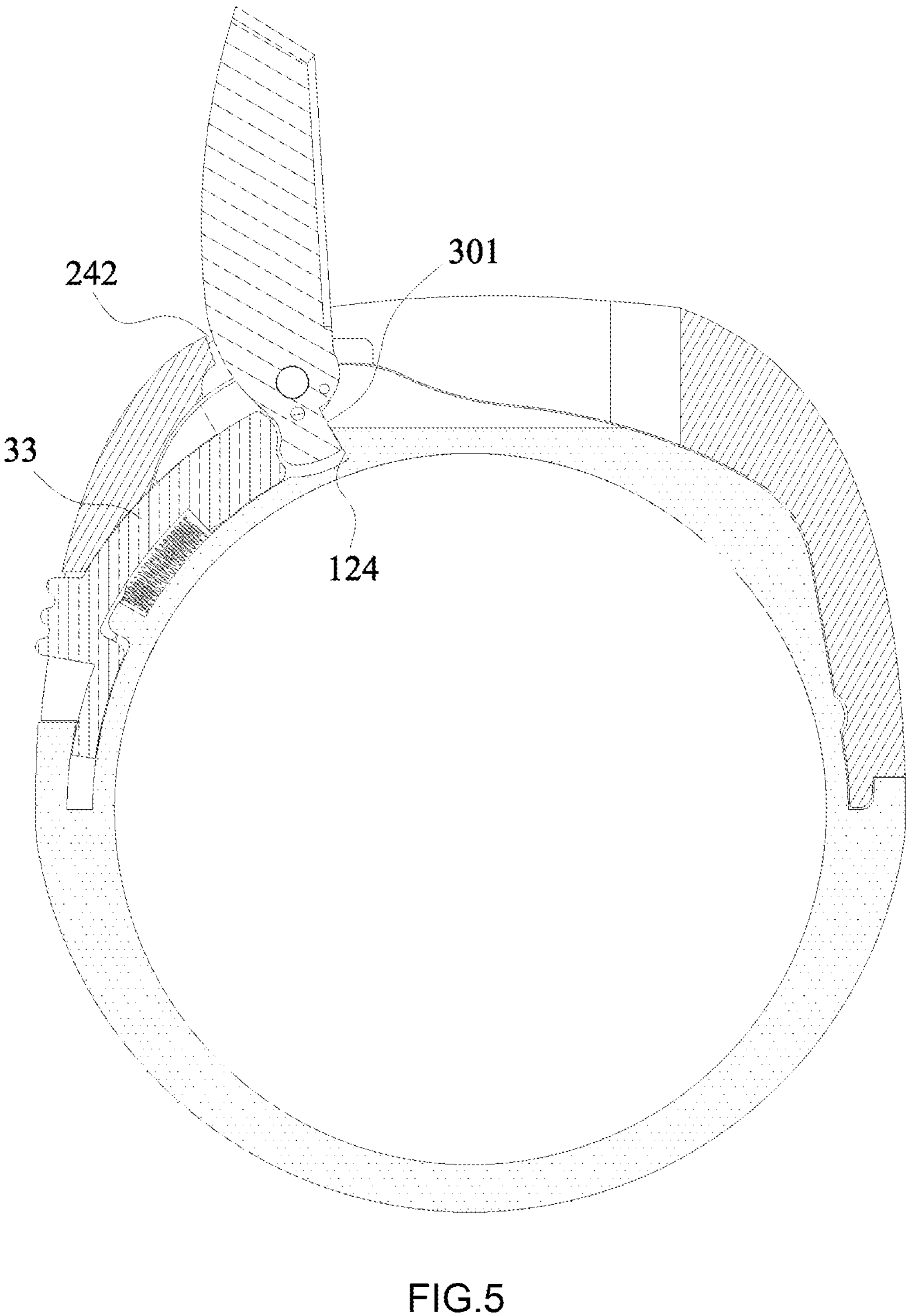
FIG. 5 is a schematic diagram of blade opening in an embodiment of the present invention.

As shown from FIG. 1 to FIG. 5, a multifunctional ring comprises a ring body (10) and a blade (30) movably arranged on the ring body (10); the ring body (10) comprises an inner ring (11), a first outer half ring (20) and a second outer half ring (26); the first outer half ring (20) and the second outer half ring (26) relatively sleeve the upper and lower sides of the inner ring (11); the first outer half ring (20) can be assembled onto the inner ring (11); the second outer half ring (26) is integrally connected with the inner ring (11); when the blade (30) is closed, it is hidden between the first outer half ring (20) and the inner ring (11); at the joint between the upper ends on both sides of the second outer half ring (26) and the inner ring (11) is designed with positioning grooves (261) and the lower ends on both sides of the first outer half ring (20) are designed with positioning blocks (21) corresponding to the positioning grooves (261); at the time of assembly, the positioning blocks (21) are embedded into the positioning grooves (261); on the outer surfaces on the left and right sides of the inner ring (11) are designed with limit protruding blocks (15); on the inner surfaces on the left and right sides of the first outer half ring (20) are designed with limit grooves (22) corresponding to the limit protruding blocks (15), and at the time of assembly, the limit protruding blocks (15) are embedded into the limit grooves (22).

The upper end of the inner ring (11) is designed with a mounting part (12) for installing the blade (30), and the blade (30) is rotatably installed onto the mounting part (12) through the rotating shaft (31), on the mounting part (12) is designed with a mounting groove (121) corresponding to the blade (30), the walls on both sides of the mounting groove (121) are designed with mounting orifices (122) corresponding to the rotating shaft (31), the blade (30) is rotatably installed in the mounting groove (121) through the cooperation of the rotating shaft (31) with the mounting orifices (122), and the inner surface of the first outer half ring (20) is designed with a holding groove (23) corresponding to the mounting part (12). The first outer half ring (20) is designed with a holding cavity (24) corresponding to the blade (30), the holding cavity (24) is connected with the holding groove (23), at the upper end of the holding cavity (24) is designed with an opening aperture for the blade (30) to rotate out and on the mounting part (12) is designed with a torsional spring (32) that makes the blade (30) always rotate out.

The multifunctional ring also comprises a switch (33) used for controlling the movement of the blade (30); the switch (33) is a toggle switch; the toggle switch is provided with an outward extending toggle block (34), the outer wall of the first outer half ring (20) is designed with a notch (25) for the toggle block (34) to extend outward, the inner ring (11) is designed with a holding groove (13) for installing the switch (33), the switch (33) is movably arranged in the holding groove (13), the surface of the switch (33) facing the holding groove (13) is designed with a groove (331), and the groove (331) is designed with a reset spring (35) that makes the switch (33) always move in the direction of the blade (30), the holding groove (13) is designed with an outward protruding stop block (14); at the time of assembly, one end of the stop block (14) extends into the groove (331), and both ends of the reset spring (35) are in pressure contact with the side wall surface of the stop block (14) and the inner wall surface of the groove (331) respectively; the switch (33) is arranged on the left side of the mounting part (12), the left end of the mounting part (12) is designed with a through groove (123) for inserting the switch (33), the upper end of the switch (33) is inserted into the mounting groove (121) through the through groove (123) and in pressure contact with the blade (30), and the lower side of the left end of the blade (30) is designed with a pressure contact surface (301); the joint between the through groove (123) and the mounting groove (121) is designed with a pressure part (124) corresponding to the pressure contact surface (301), the pressure part (124) is located below the blade (30), the upper side of the left end of the blade (30) is designed with a pressure groove (302), and the upper end of the switch (33) is designed with a pressure protruding block (332) corresponding to the pressure groove (302); when the blade (30) is closed, the pressure contact surface (301) is in pressure contact with the upper end of the switch (33).

It should be noted that the inner ring (11) of the present invention can be a structure of a single integral ring or a structure which are spliced and assembled together by an upper inner half ring and a lower inner half ring or by a left inner half ring and a right inner half ring.

The assembly procedure of the present invention: install the blade (30) and torsional spring (32) onto the mounting part (12), and then install the switch (33) and the reset spring (35) in the holding groove (13), and then embed the positioning block (21) of the first outer half ring (20) into the positioning groove (261), and finally embed the limit protruding block (15) of the inner ring (11) into the limit groove (22) of the first outer half ring (20) to complete the assembly of the ring.

The embodiments described above are merely preferable embodiments of the present invention and not used to limit the present invention; therefore, any modification, equivalent replacement or improvement actually made to the above embodiments in accordance with the technology of the present invention should be included in the scope claimed by the technical solutions of the present invention.

What is claimed is:

1. A multifunctional ring, which is characterized in that it comprises a ring body and a rotatable blade arranged on the ring body; the ring body comprises an inner loop-shaped portion, a first outer arcuate portion and a second outer arcuate portion; the first outer arcuate portion and the second outer arcuate portion surround the inner loop-shaped portion; the first outer arcuate portion is detachably assembled with the inner loop-shaped portion; the blade is able to rotate to a hidden position between the first outer arcuate portion and the inner loop-shaped portion; the second outer arcuate portion is inseparable from the inner loop-shaped portion; the first outer arcuate portion and the second outer arcuate portion oppositely surround the inner loop-shaped portion together; a left locating groove is arranged between a left end of the second outer arcuate portion and a first corresponding position of the inner loop-shaped portion, a right locating groove is arranged between a right end of the second outer arcuate portion and a second corresponding position of the inner loop-shaped portion; a left locating block is arranged at a left end of the first outer arcuate portion, a right locating block is arranged at a right end of the first outer arcuate portion; the left locating block is embedded into the left locating groove and the right locating block is embedded into the right locating groove; a left protruding block is arranged on a left side of the inner loop-shaped portion and a right protruding block is arranged on a right side of the inner loop-shaped portion; a left limit groove is arranged on an inner side of the first outer arcuate portion corresponding to position of the left protruding block, and a right limit groove is arranged on the inner side of the first outer arcuate portion corresponding to position of the right protruding block; the left protruding block is embedded into the left limit groove and the right protruding block is embedded into the right limit groove.

2. The multifunctional ring in accordance with claim 1, which is characterized in that a mounting part for installing the rotatable blade is arranged on the inner loop-shaped portion, and the rotatable blade is installed in the mounting part through a left shaft on one side of the rotatable blade and a right shaft on the opposite side of the rotatable blade; a holding groove is arranged on the first outer arcuate portion corresponding to position of the mounting part.

3. The multifunctional ring in accordance with claim 2, which is characterized in that a holding cavity is arranged on the first outer arcuate portion corresponding to the rotatable blade, the holding cavity is interconnected with the holding groove, a torsional spring is arranged on the mounting part to make the rotatable blade rotate outward, and an opening aperture is arranged on the holding cavity for the rotatable blade to rotate out.

4. The multifunctional ring in accordance with claim 3, which is characterized in that a switch is arranged adjacent to the rotatable blade, a installing groove is arranged on the inner loop-shaped portion, the switch is movably embedded in the installing groove.

5. The multifunctional ring in accordance with claim 4, which is characterized in that a gap is arranged on a bottom of the switch, a stop block is arranged in the installing groove corresponding to position of the gap, the stop block protrudes into the gap, a reset spring is arranged in the gap, a first end end of the reset spring presses against the stop block and a second end of the reset spring presses against the gap to make the switch move toward the rotatable blade.

6. The multifunctional ring in accordance with claim 5, which is characterized in that a through groove and a mounting groove are arranged on the mounting part, the switch is inserted into the mounting groove via the through groove and presses against the rotatable blade, a pressing plane is arranged on one end of the rotatable blade opposite to the switch, a pressing part is arranged on a joint of the through groove and the mounting groove corresponding to the pressing plane, which is located below the rotatable blade, when the rotatable blade rotates inward, the pressing plane presses against the switch, when the rotatable blade rotates outward, the pressing plane presses against the pressing part.

* * * * *